United States Patent
Plumb et al.

(10) Patent No.: US 9,705,566 B2
(45) Date of Patent: Jul. 11, 2017

(54) WIRELESS CHARGER COMMUNICATION AUTOMATIC GAIN CONTROL

(71) Applicant: MediaTek Singapore Pte. Ltd., Singapore (SG)

(72) Inventors: William Plumb, Charlestown, MA (US); Anand Satyamoorthy, Somerville, MA (US); Patrick Stanley Riehl, Cambridge, MA (US)

(73) Assignee: MEDIATEK Singapore Pte. Ltd., Solaris (SG)

(*) Notice: Subject to any disclaimer, the term of this patent is extended or adjusted under 35 U.S.C. 154(b) by 161 days.

(21) Appl. No.: 14/505,494

(22) Filed: Oct. 2, 2014

(65) Prior Publication Data

US 2015/0093989 A1     Apr. 2, 2015

Related U.S. Application Data

(60) Provisional application No. 61/885,604, filed on Oct. 2, 2013.

(51) Int. Cl.
| | |
|---|---|
| *H04B 5/00* | (2006.01) |
| *H02J 7/02* | (2016.01) |
| *H02J 5/00* | (2016.01) |
| *H04B 1/04* | (2006.01) |
| *H02J 50/80* | (2016.01) |
| *H02J 50/10* | (2016.01) |
| *H02J 50/40* | (2016.01) |

(52) U.S. Cl.
CPC ............ *H04B 5/0037* (2013.01); *H02J 5/005* (2013.01); *H02J 7/025* (2013.01); *H02J 50/10* (2016.02); *H02J 50/80* (2016.02); *H02J 50/40* (2016.02); *H04B 5/0031* (2013.01); *H04B 2001/0416* (2013.01)

(58) Field of Classification Search
CPC .. H02J 5/005; H02J 50/10; H02J 7/025; H02J 50/80; H02J 50/40; H04B 2001/0416; H04B 5/0031; H04B 5/0037
See application file for complete search history.

(56) References Cited

U.S. PATENT DOCUMENTS

| | | | | |
|---|---|---|---|---|
| 7,095,217 | B1* | 8/2006 | Niculae | G05F 1/56 323/274 |
| 2005/0130603 | A1* | 6/2005 | Maclean | H04B 1/54 455/78 |
| 2007/0188219 | A1* | 8/2007 | Segarra | G01R 19/32 330/2 |
| 2010/0007307 | A1* | 1/2010 | Baarman | H02J 5/005 320/108 |
| 2011/0239084 | A1* | 9/2011 | Abbasfar | G06F 11/1004 714/758 |

(Continued)

*Primary Examiner* — Lewis West
(74) *Attorney, Agent, or Firm* — Wolf, Greenfield & Sacks, P.C.

(57) ABSTRACT

A variable gain circuit used in an in-band communication system is provided that includes a current sense pickup that is coupled to the output of a DC power source that senses current from the DC power source and provides a first output signal. A variable controlled amplifier structure, that is coupled to the DC power source, receives the first output signal and provides a specified amount of gain to the first output signal so as to produce a second output signal. A digital signal is produced using the second output having a selected frequency bandwidth.

18 Claims, 11 Drawing Sheets

(56) References Cited

U.S. PATENT DOCUMENTS

| | | | |
|---|---|---|---|
| 2011/0260681 A1* | 10/2011 | Guccione | H02J 7/0054 320/108 |
| 2013/0214761 A1* | 8/2013 | Chang | G01R 31/2853 324/76.77 |
| 2015/0035564 A1* | 2/2015 | Tobin | G06F 1/26 327/56 |
| 2015/0341087 A1* | 11/2015 | Moore | H04B 5/0031 455/77 |

* cited by examiner

WIRELESS CHARGER COMMUNICATION AUTOMATIC GAIN CONTROL

CROSS REFERENCE TO RELATED APPLICATIONS

This application claims priority from U.S. provisional application Ser. No. 61/885,604 filed Oct. 2, 2013, which is incorporated herein by reference in its entirety.

BACKGROUND

The invention is related to the field of charging based systems, and in particular a wireless charger communication automatic gain control.

Current wireless power transfer systems (also referred to as wireless charging) in the market that employ in-band communication use a fixed receiver gain signal chain. Automatic gain control can be used to increase the dynamic range of the in-band communications system to improve communication performance. The invention is an improvement over existing wireless charging in-band communication systems that use fixed receiver gain topologies.

SUMMARY

According to one aspect of the invention, there is provided a variable gain circuit used in an in-band communication system comprising. The variable gain circuit includes a current sense pickup that is coupled to the output of a DC power source that senses current from the DC power source and provides a first output signal. A variable controlled amplifier structure, that is coupled to the DC power source, receives the first output signal and provides a specified amount of gain to the first output signal so as to produce a second output signal. A digital signal is produced using the second output having a selected frequency bandwidth.

According to another aspect of the invention, there is provided a wireless power system. The wireless power system includes a transmitter side that transmits a transmitted signal for reception, and a receiver side that receives the transmitted signal from the transmitter side. A current sense pickup is coupled to the output of a DC power source that senses current from the DC power source and provides a first output signal. A variable controlled amplifier structure, that is coupled to the DC power source, receives the first output signal and provides a specified amount of gain to the first output signal so as to produce a second output signal. A digital signal is produced using the second output having a selected frequency bandwidth.

According to another aspect of the invention, there is provided a wireless power system. The wireless power system includes a transmitter side that transmits a transmitted signal for reception, and a receiver side that receives the transmitted signal from the transmitter side. A current sense pickup structure that receives a signal stream having a plurality of DC signals and senses the current for each input signal producing a second signal stream. A plurality of variable amplifier structures receive the second signal stream, each variable amplifier structure provides a specified amount of gain to their respective second signal in the second signal stream so as to produce a third output signal stream. A multiplexer selects a third signal from the third output signal stream, via a signal stream selection module, to produce a digital signal.

According to another aspect of the invention, there is provided a wireless power system. The wireless power transmitter includes a detection circuit for in-band communications. The detection circuit includes one or more sense amplifiers, wherein the gain of the detection circuit is variable.

According to another aspect of the invention, there is provided a method for decoding an in-band communications signal in a wireless power transmitter. The method includes providing a detection circuit for in-band communications, and providing one or more sense amplifiers, wherein the gain of the detection circuit is variable.

DETAILED DESCRIPTION

The invention presents an in-band communications system designed for a non-radiative, near field, wireless power transfer (WPT) system. Desirable attributes of a WPT system are to provide a safe and efficient wireless charging environment for single or multiple mobile consumer devices. A WPT charging system consists of a Source (Charger) and one or more Load devices where power is transferred wirelessly from the Source to one or more Loads.

Figure 1:
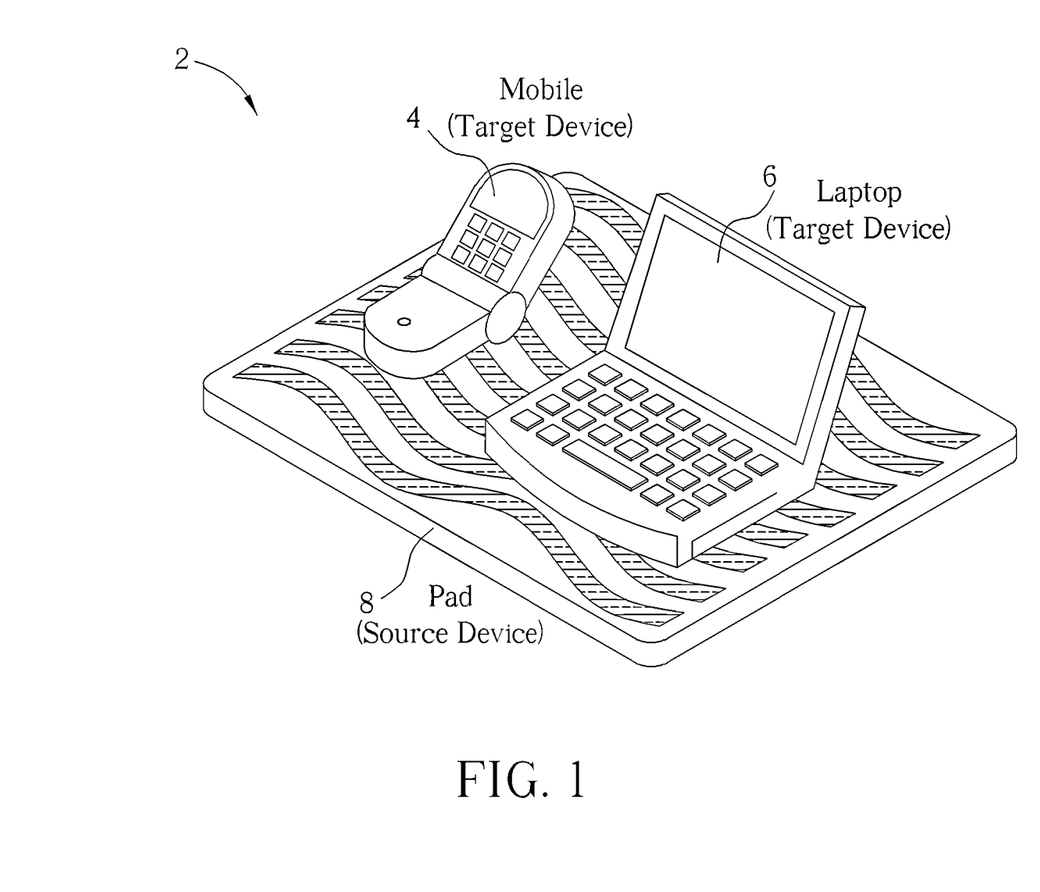
FIG. 1 is a schematic diagram illustrating a wireless source/loads pad configuration used in accordance with the invention.

FIG. 1 shows an arrangement 2 having a source pad 8 charging a mobile phone 4 and laptop 6 positioned on the charging surface. To provide a good user experience it is essential to have some degree of communication at the very least from the Load to the Source. A distinction must be made between resonant wireless power (RWP) systems and inductive wireless power (IWP) systems as a resonant charging system can operate in loosely coupled conditions between the Source and the Load devices. The ratio of the area of the Source to Load coil for an RWP system can be >1 whereas IWP systems tend have a coil ratio of ≈1. RWP systems allow freedom of placement encompasses charging at a distance, arbitrary orientation of the Load on the Source and multi-Load simultaneous charging. Communication from Load to Source allows a range of features from power management including: Load device detection and intelligent control of power transfer between Source and each Load and low power standby mode; and safety including: foreign object detection (FOD) and Load device over temperature and voltage.

Figure 2:
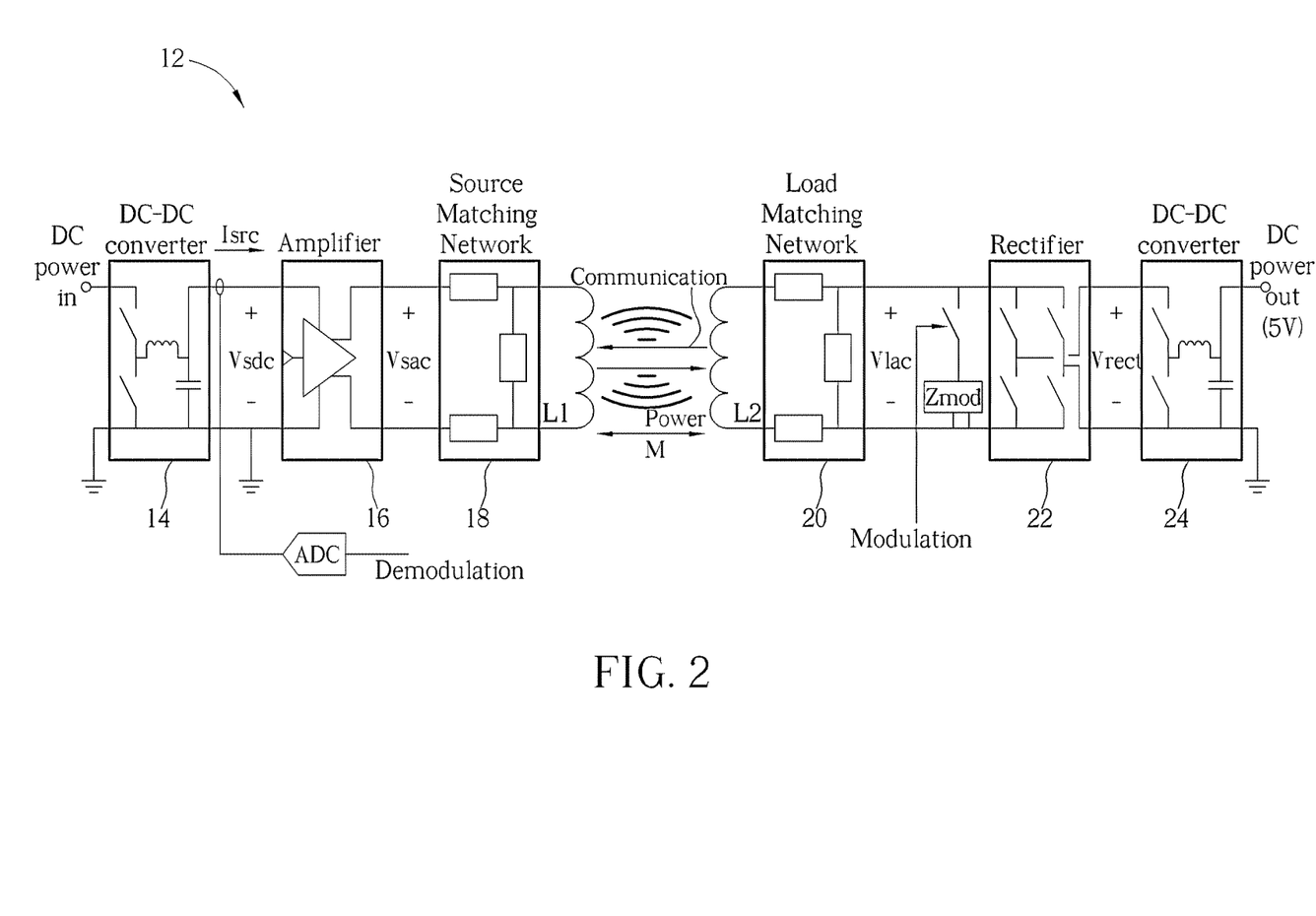
FIG. 2 is a schematic diagram illustrating a wireless power system with load modulation used in accordance with the invention.

FIG. 2 shows a block diagram of a wireless power system 12 that incorporates in-band communications from Load to Source via load modulation. The amplifier 16 converts a DC power source 14 to AC at the power transmission frequency. The AC power is applied to a source inductor L1 through a matching network 18. Voltage is induced on the Load device inductor L2 through the mutual inductance M.

The receiver matching network 20 conveys this power to the rectifier 22, which converts the power back to a DC power source 24 for use in the target device. Load modulation is applied to the rectifier 22 input voltage in this example, through switching of impedance Zmod. For resonant systems this impedance is typically resistive. Switching the impedance changes the loading seen by the Source, which causes the power delivered across the air interface to be modulated. This modulation can be detected by monitoring the input current to the amplifier, Isrc.

Figure 3:
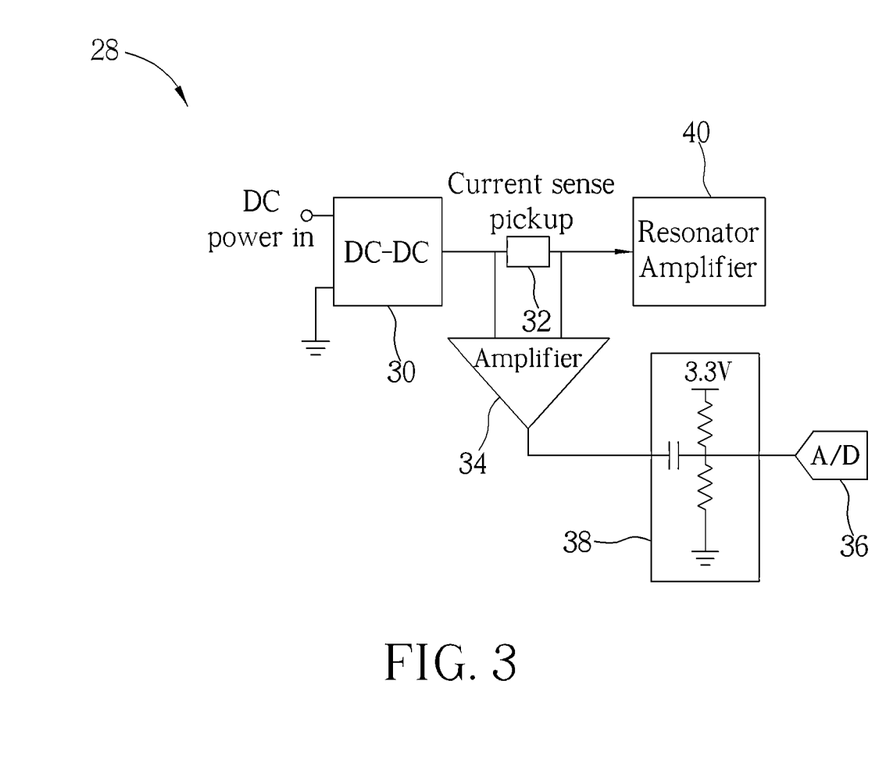
FIG. 3 is a schematic diagram illustrating a wireless power system used in accordance with the invention.

FIG. 3 shows an example of a fixed gain circuit 28 that can be used sense an in-band communication received signal Isrc. The current sense pickup 32 determines the current being received from the DC-DC converter 30. The output from the current sense pickup 32 is provided to the variable control amplifier 34. The output of the amplifier 34 is sent to bandpass filter 38. The output of the bandpass filter 38 is provided to a ADC 36 and converted in to a digital signal.

Figure 5:
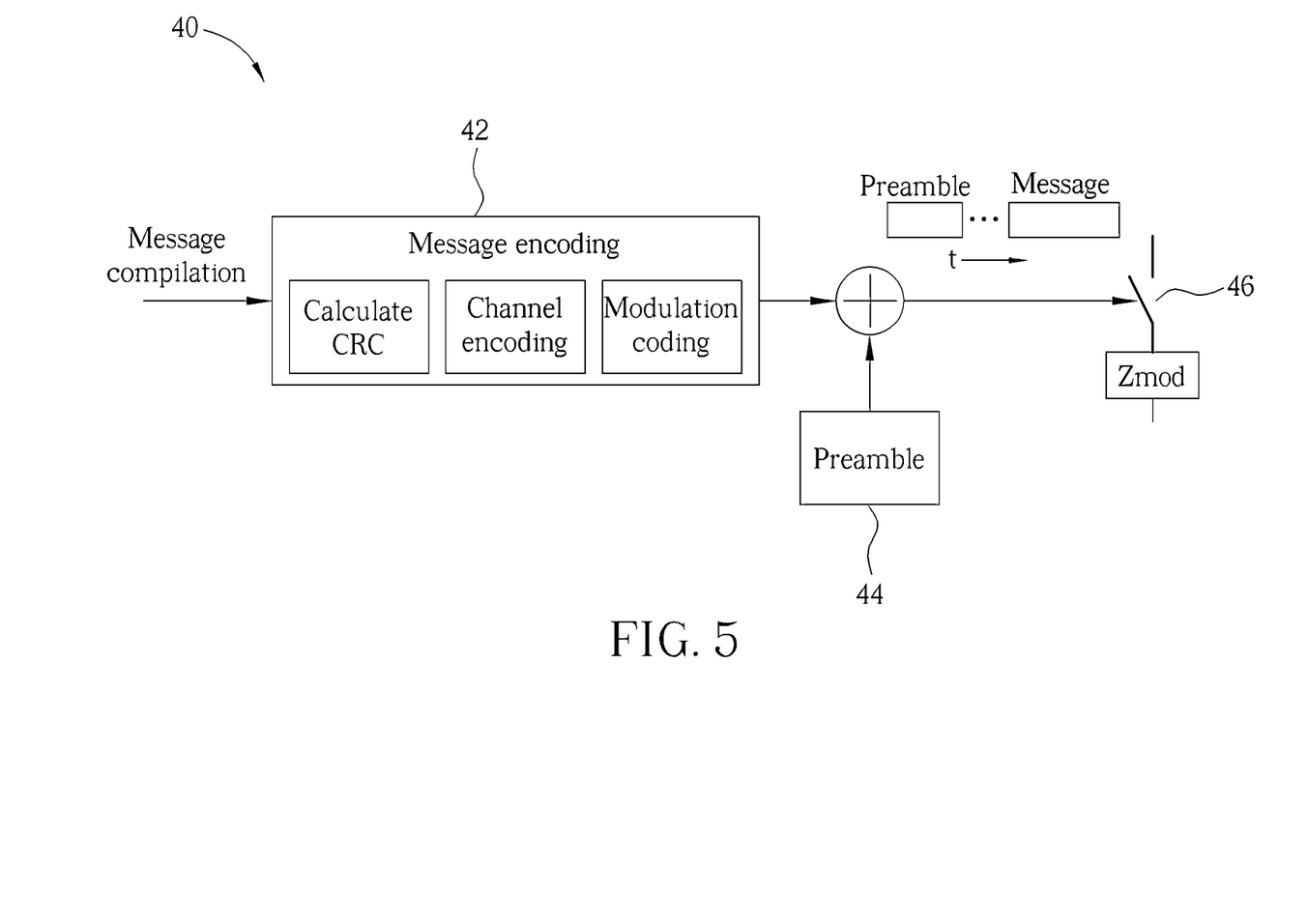
FIG. 5 is a schematic diagram illustrating a low complexity communication system used in accordance with the invention.
Figure 6:
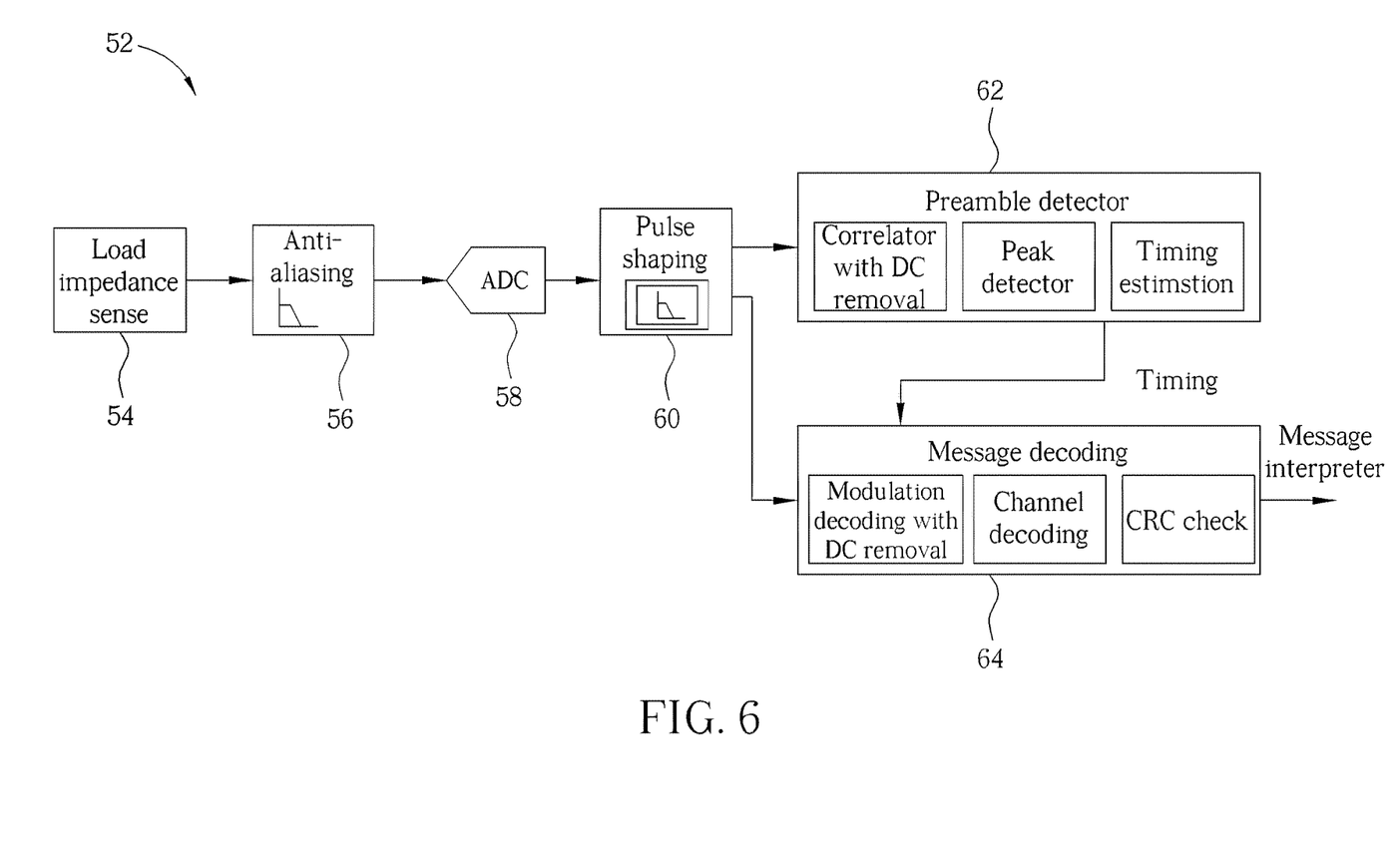
FIG. 6 is a schematic diagram illustrating the RX communication path used in accordance with the invention.

A low complexity communication system is shown in FIG. 5 and FIG. 6. The in-band transmitter 40 in FIG. 5 uses an encoding module 42 to format a message by attaching a CRC to the message for error detection and then channel encodes the message for error correction. A BCH (15, 7) double error correcting code may be used for error correction. A switch 46 is used to perform biphase modulation causing changes in reflected impedance seen by the Source. A Golay complementary code (preamble) 44 may be prefixed to the message.

FIG. 6 shows the in-band receiver 52 using an impedance sensing circuit 54 to detect changes in the reflected impedance followed by an analog anti-aliasing filter 56 and the analog-to-digital converter (ADC) 58. The front end digital filter 60 does pulse shaping and noise rejection. The receiver preamble detection block 62 is used for message detection and synchronization/timing adjustment. A message decoding block 64 performs biphase demodulation with error correction as well as BCH error correction channel decoding, and error detection (CRC).

The received communication signal at Isrc can have modulated on a large DC offset depending on the total power delivered to all the Load devices. The design includes a course DC offset removal in the analog domain and a fine DC offset removal in the digital decoder. Any modulation scheme used needs to be able to pass through the DC removal without appreciable distortion.

Figure 7A:
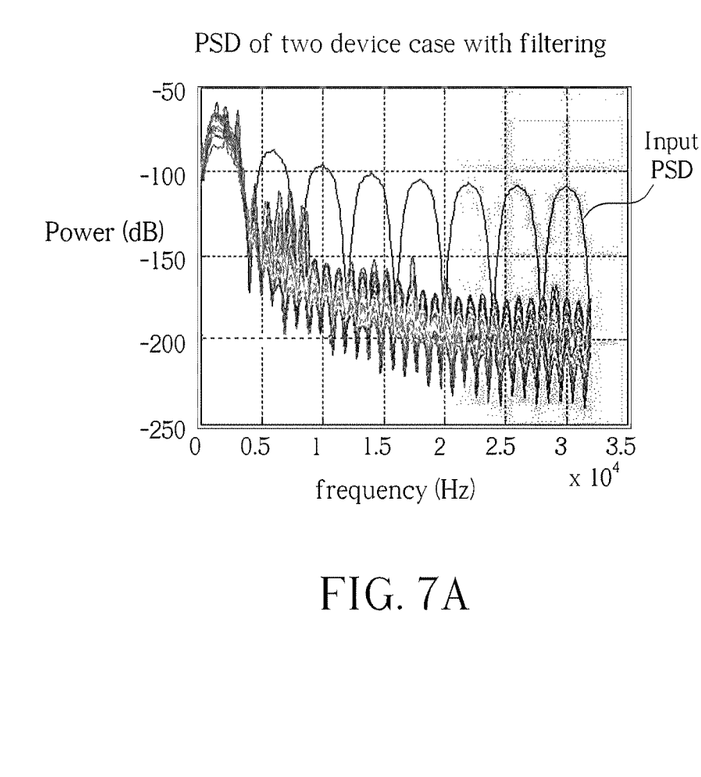
FIGS. 7A-7B are graphs illustrating the performance of the pulse shaping filter used in accordance with the invention.
Figure 7B:
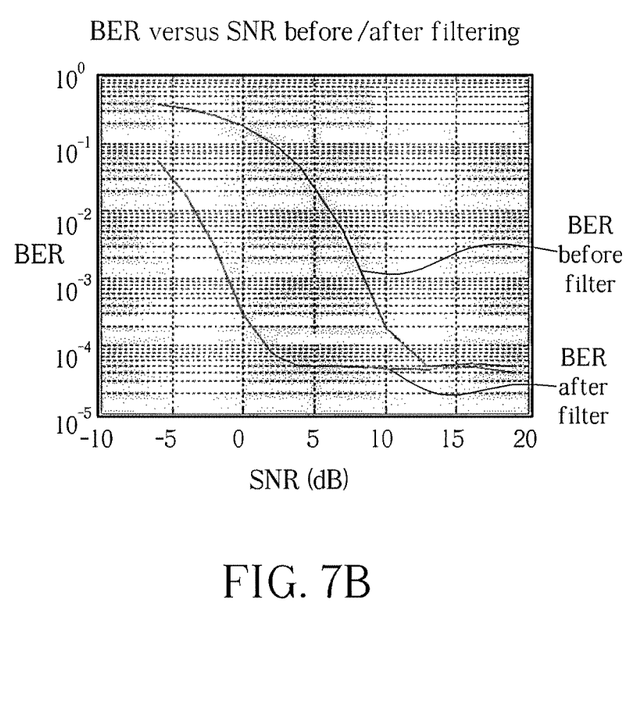

In-band communication in a wireless charging system can result in some challenging channel conditions as shown in PSD of FIG. 6. It should be noted that only the main lobe of the biphase signal is required to decode the received signal. The pulse shaping filter 60 can be designed to attenuate everything but the main lobe as shown in FIGS. 7A-7B show the improvement in performance after filtering.

In low coupling conditions or when one or multiple devices are charging the change in load impedance seen at the Source due to switching the modulation impedance at the Load can be small. It is possible that in these cases the dynamic range or sensitivity of a fixed gain load impedance circuit is not enough to allow reliable reception of messages from the Load. Table 1 shows the voltage measured at the output of the impedance sense circuit versus distance and Vsource for a single Load taken from a two Load device charging pad. FIG. 2 shows the location of the measurements Vsdc and Vrect.

The current sense circuit (FIG. 3 32) used a resistor of 48 mΩ as the current sense pickup and an amplifier gain of 100 (FIG. 3 34) giving an overall gain of 4.8. If a 54 dB (9 bit) dynamic range ADC was used in the receiver circuit with a full range of 0-3.3V then the $V_{Isense}$ signal level shown in Table 1 is approaching the limit of the signal level that can be decoded successfully. In this case with a 54 dB dynamic range ADC the smallest ADC step is 6.44 mV.

TABLE 1

Measured data of output of impedance sense circuit versus distance and Vsource for a single Load taken from a two Load charging pad

| Z height from SD (mm) | Vsource (V) | Vrect (V) | $V_{Isense}$ (mVpeak-peak) |
|---|---|---|---|
| 15.3 | 8.9 | 4.6 | 9 |
| 16.3 | 10 | 5.3 | 14 |

Figure 4:
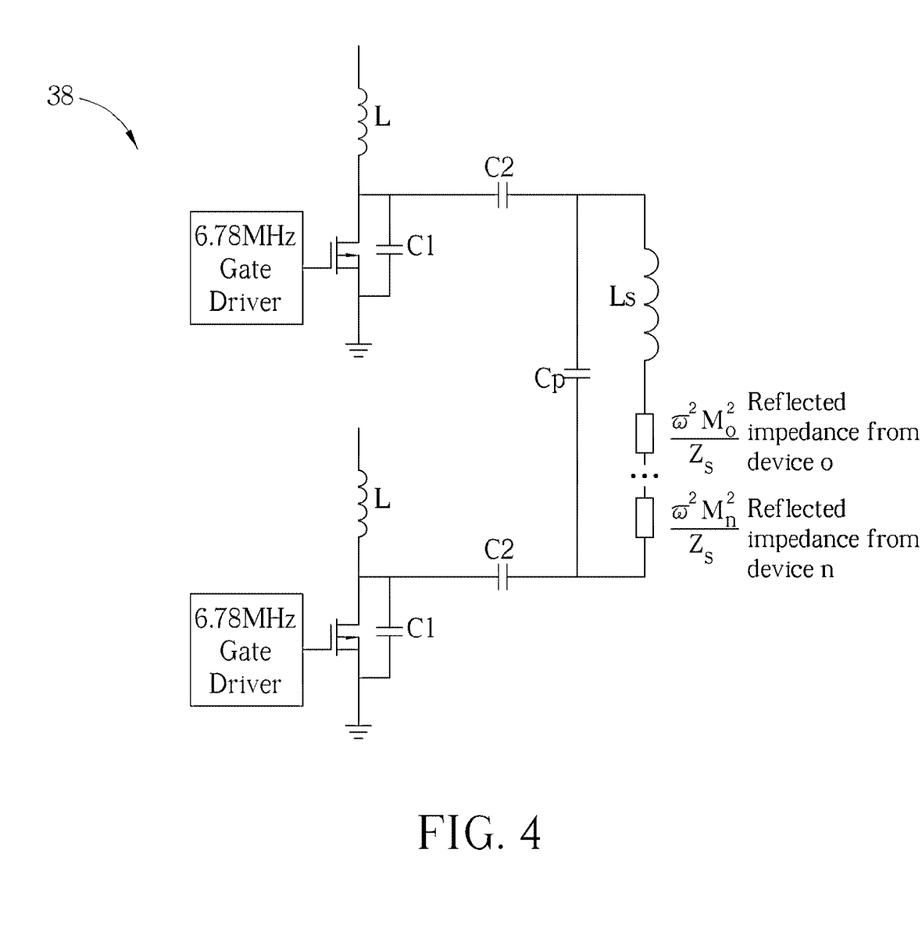
FIG. 4 is a schematic showing the equivalent circuit with N×Load devices shown on the Source side as reflected impedance.

Similarly if multiple Loads are placed on the Source the ΔIsense, due to switching of the modulation impedance of a single Load, is decreased. FIG. 4 shows the equivalent circuit 38 of the Source and N×Loads with the Load impedances shifted to the Source side (Primary side of the transformer). From FIG. 4 the power amplifier must produce a high enough voltage to supply power to multiple Load devices, and as a consequence any change in reflected impedance of a single Load due to the switching of its modulation impedance, results in a smaller change in Isense than would occur with only a single Load charging.

In low coupling conditions and when multiple Load are charging the in-band communication would benefit from greater dynamic range/sensitivity.

The following are ways to increase the sensitivity of the current sense circuit
1. Increase the fixed gain—does not increase the dynamic range of the circuit
2. Increase the dynamic range of the ADC—includes oversampling the input signal
3. Implement some form of variable gain or automatic gain control (AGC)

Only 2&3 listed above increase the dynamic range of the current sense circuit. Increasing the dynamic range of the ADC is a simple way of increasing the dynamic range but there is a tradeoff between increasing the dynamic range with cost and power. Increasing the dynamic range of the in-band communications receiver via variable gain is a low complexity and low cost method.

Figure 8:
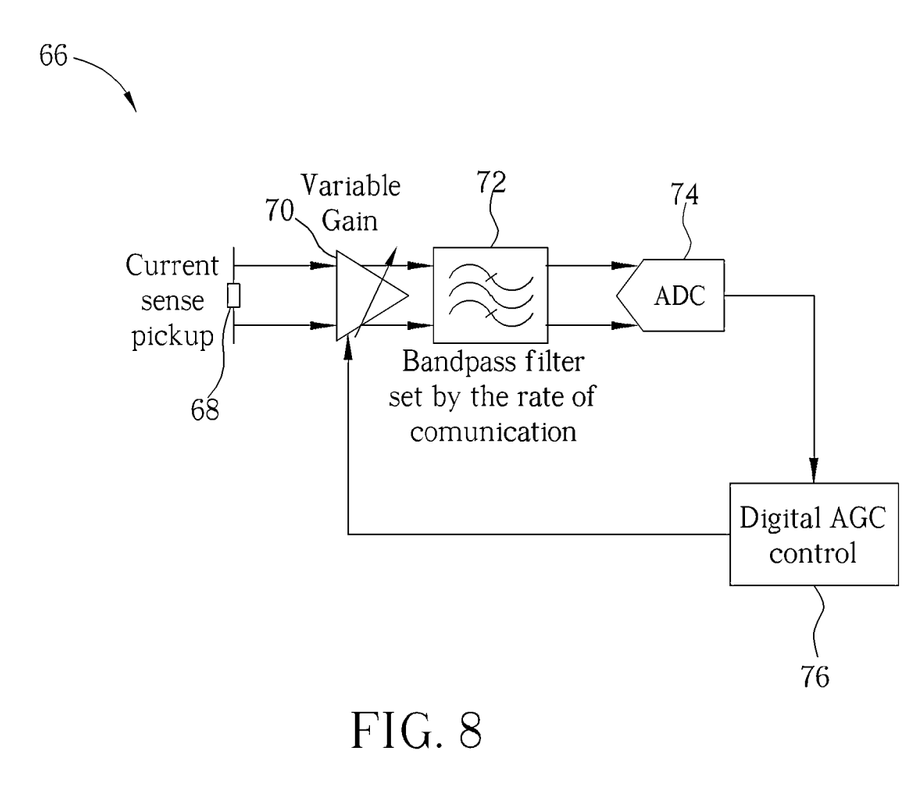
FIG. 8 is schematic diagram illustrating a current sense AGC circuit used in accordance with the invention.

FIG. 8 shows an embodiment of the AGC circuit used to sense current. The AGC circuit 66 includes current sense pickup module 68 that provides a voltage signal measuring the current and providing that a first output signal to an amplifier 70. The current sense pickup module 68 may be implemented by a sense resistor of 48 mΩ, and the voltage across the sense resistor is dc-coupled to the sense amplifier 70. The amplifier 70 provides variable gain of its output. The amplifier 70 produces a second output signal that is provided to a bandpass filter 72. The bandpass filter 72 is set by the rate of communication, and produces a third output signal received by an analog digital converter (ADC) 74. The ADC 74 converts the third output signal into a digital signal. Positioned in a feedback loop is a digital AGC control 76 that controls the variable gain parameters of the amplifier 70. The digital part of the AGC can determine the signal level by processing the signal to give an indication of its power level. An example would be either the Root Mean Square (RMS) of the signal of just the Square of the signal.

Figure 9:
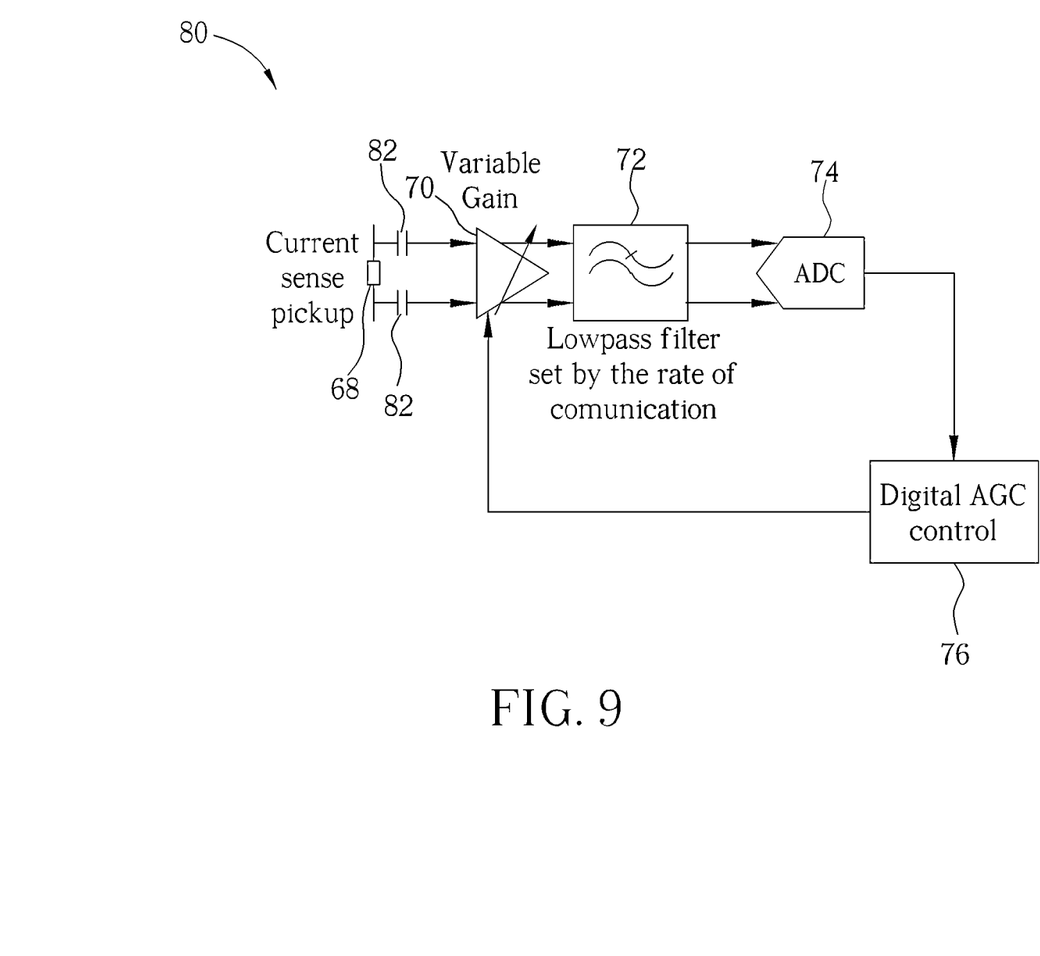
FIG. 9 is schematic diagram illustrating another embodiment of the current sense AGC circuit used in accordance with the invention.

FIG. 9 shows another embodiment 80 of the AGC circuit used to sense current. The overall design is similar to the structure shown in FIG. 8. The key difference is the high-pass filters 82 positioned at the input of the amplifier 70. Therefore the output of the current sense pickup module 68 is ac-coupled to the sense amplifier 70. The DC content of the signal can be large and removing a portion of the DC component via the high-pass filter 82 allows for a greater gain value to be set by the variable amplifier 70.

The digital AGC control 76 can perform a number of functions. One of these functions is monitoring the signal level over a specified window of time and then setting the gain dynamically for each time slot depending on the expected signal level from each Load device to give the best sensitivity—if clipping is detected then reduce the gain. The digital AGC control can set the gain to maximum and when signal clipping is detected reduce the gain until clipping is eliminated. In a multiple Load charging scenario it is possible for each Load to have different coupling factors. Note that the coupling factor for a Load only changes when the device is moved and is not expected to vary quickly over time. For a synchronous communications system where it is known where each device will transmit an AGC context could be keep for each Load. A gain value specific to the Load that is about to transmit is set before each Load transmits a message. The gain setting calculated in each Load's AGC context would be based on the signal level from previous messages from that specific Load.

Figure 10:
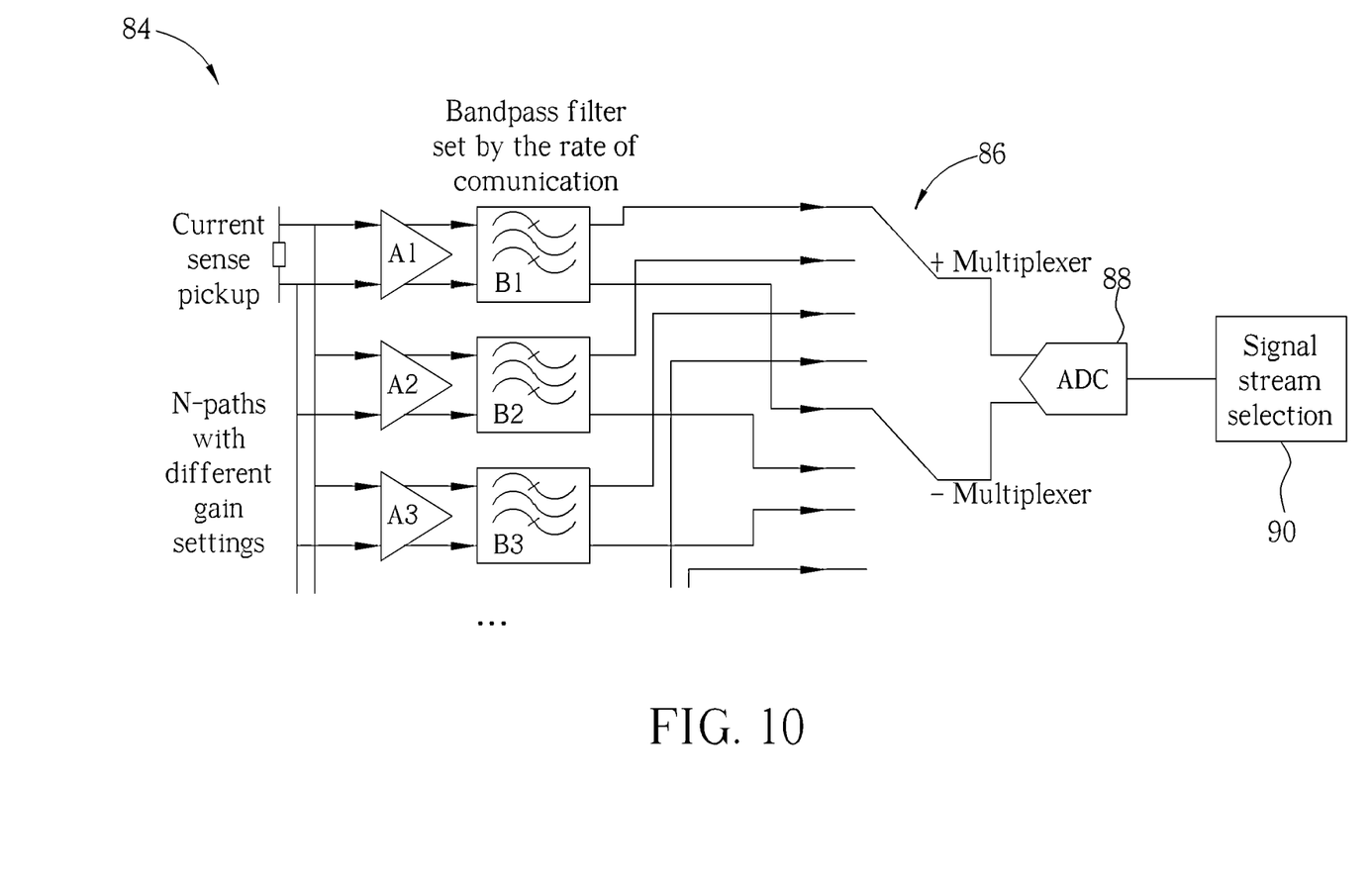
FIG. 10 is a schematic diagram illustrating an AGC circuit having a N-path gain setting arrangement.

FIG. 10 shows an arrangement 84 having a N-path with different gain settings to increase dynamic range. The arrangement includes a N-number of current paths that is coupled to amplifiers A1-AN and bandpass filters B1-BN (three amplifiers A1-A3 and three bandpass filters B1-B3 are shown in FIG. 10 as an example). The current sense pickup module may be implemented by a sense resistor of 48 mΩ, and the voltage across the sense resistor is dc-coupled to the sense amplifier A1-A3. The amplifiers A1-A3 provide their first output signals to bandpass filters B1-B3 respectively. The bandpass filters B1-B3 provide their respective outputs to a multiplexer 86. The multiplexer 86 selects one of the outputs of the bandpass filters B1-B3 to be received by an ADC 88. In one embodiment, the multiplexer 86 selects the outputs of the bandpass filters B1-B3 to be received by the ADC 88 in an interleaved fashion. Note in other embodiments of the invention more than 3 amplifiers and bandpass filters B1-B3 can be used for this arrangement.

This approach increases the dynamic range by providing multiple paths with different gain settings for each path. The signal stream module 90 can then select the signal with the magnitude that gives the best performance (e.g. provides the maximum signal without clipping). The signal stream selection element 90 may select the data stream dynamically for each time slot depending on the expected signal level from each target device.

Figure 11:
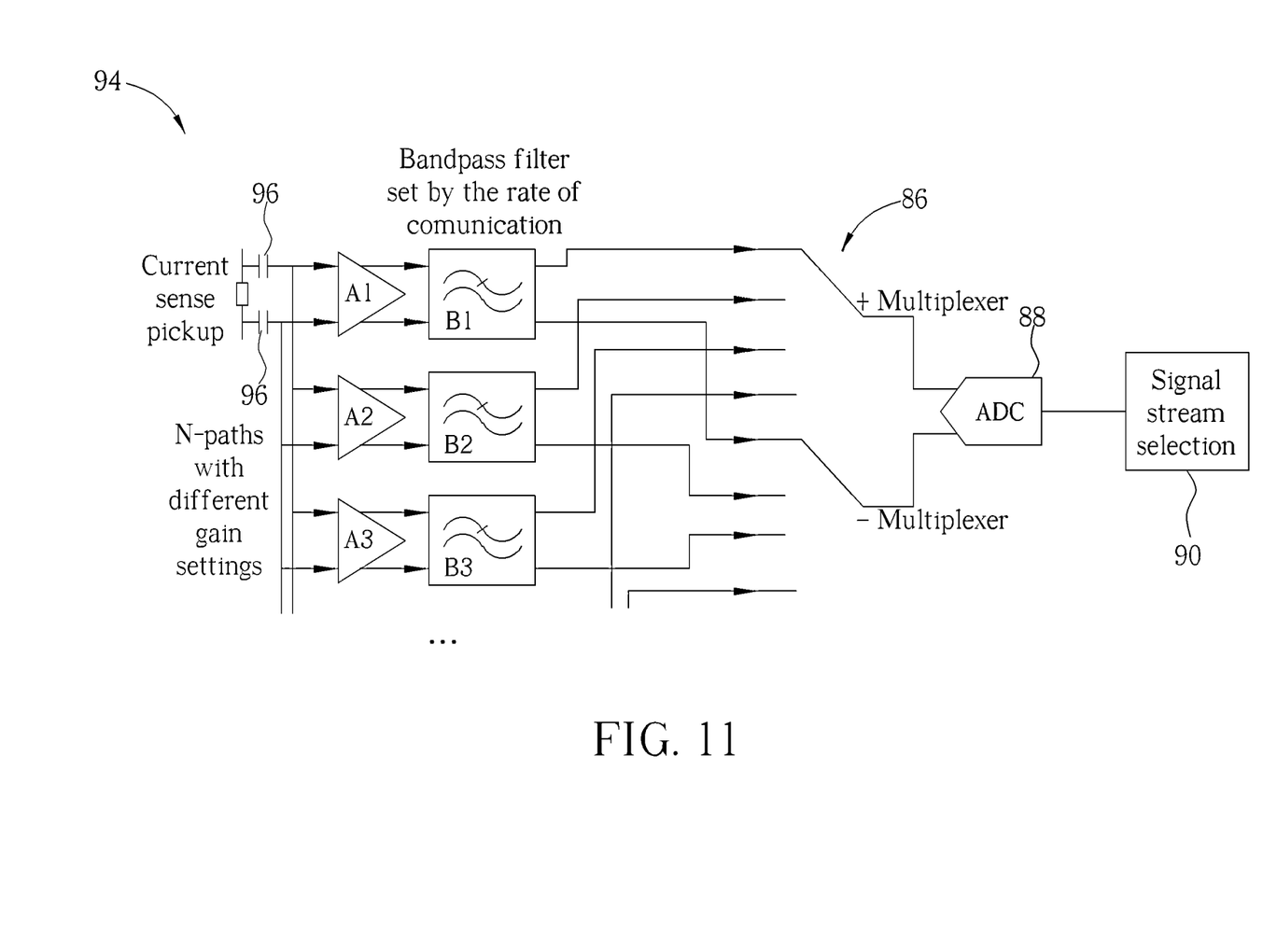
FIG. 11 is a schematic diagram illustrating another embodiment of the AGC circuit having a N-path gain setting arrangement.

FIG. 11 shows another embodiment of the AGC circuit having a N-path gain setting arrangement 94. The overall design is similar to the structure shown in FIG. 10. The key difference is the high pass filters 96 positioned at the input of the amplifiers A1-A3. Therefore the output of the current sense pickup module is ac-coupled to the sense amplifier A1-A3. The DC content of the signal can be large and removing a portion of the DC component via the high pass filter 96 allows for a greater gain value to be set by the variable amplifier A1-A3.

Although the present invention has been shown and described with respect to several preferred embodiments thereof, various changes, omissions and additions to the form and detail thereof, may be made therein, without departing from the spirit and scope of the invention.

What is claimed is:

1. A variable gain circuit used in an in-band communication system comprising:
  a current sense pickup that is coupled to the output of a DC power source that senses current from the DC power source and provides a first output signal;
  a variable controlled amplifier structure, that is coupled to the DC power source, receives the first output signal and provides a specified amount of gain to the first output signal so as to produce a second output signal, wherein a digital signal is produced using the second output having a selected frequency bandwidth; and
  an automatic gain control circuit configured to receive the digital signal and adjust the specified amount of gain based on the digital signal.

2. The variable gain circuit of claim 1, wherein the variable controlled amplifier structure is coupled to a resonator structure.

3. The variable gain circuit of claim 1, wherein the variable controlled amplifier structure provides its output to an analog to digital converter (ADC).

4. The variable gain circuit of claim 1, wherein the amplifier structure comprises variable gain.

5. The variable gain circuit of claim 1, wherein the variable controlled amplifier structure receives input from an external source to control its variable gain.

6. The variable gain circuit of claim 5, wherein the external source receives as input the output of an ADC to control the variable gain of the amplifier structure.

7. The variable gain circuit of claim 1, wherein the variable controlled amplifier structure comprises high pass filters at its input.

8. The variable gain circuit of claim 1, wherein the variable controlled amplifier structure and current sense pickup are positioned on a transmitter side of the in-band communication system.

9. A wireless power system comprising:
  a transmitter side that transmits a transmitted signal for reception;
  a receiver side that receives the transmitted signal from the transmitter side;
  a current sense pickup that is coupled to the output of a DC power source that senses current from the DC power source and provides a first output signal;
  a variable controlled amplifier structure, that is coupled to the DC power source, receives the first output signal and provides a specified amount of gain to the first output signal so as to produce a second output signal, wherein a digital signal is produced using the second output having a selected frequency bandwidth; and
  an automatic gain control circuit configured to receive the digital signal and adjust the specified amount of gain based on the digital signal.

10. The wireless power system of claim 9, wherein the variable controlled amplifier structure is coupled to a resonator structure.

11. The wireless power system of claim 9, wherein the variable controlled amplifier structure provides its output to an analog to digital converter (ADC).

12. The wireless power system of claim 9, wherein the variable controlled amplifier structure comprises variable gain.

13. The wireless power system of claim 9, wherein the variable controlled amplifier structure receives input from an external source to control its variable gain.

14. The wireless power system of claim 13, wherein the external source receives as input the output of an ADC to control the variable gain of the amplifier structure.

15. The wireless power system of claim 9, wherein the variable controlled amplifier structure comprises high pass filters at its input.

16. The wireless power system of claim 9, wherein the variable controlled amplifier structure and current sense pickup are positioned on the transmitter side of the wireless power system.

17. A wireless power system comprising:
- a transmitter side that transmits a transmitted signal for reception;
- a receiver side that receives the transmitted signal from the transmitter side;
- a current sense pickup structure that receives a signal stream having a plurality of DC signals and senses the current for each input signal producing a second signal stream;
- a plurality of variable amplifier structures that receive the second signal stream, each variable amplifier structure provides a specified amount of gain to their respective second signal in the second signal stream so as to produce a third output signal stream; and
- a multiplexer that selects a third signal from the third output signal stream, via a signal stream selection module, to produce a digital signal.

18. A variable gain circuit used in an in-band communication system comprising:
- a current sense pickup structure that receives a signal stream having a plurality of DC signals and senses the current for each input signal producing a second signal stream;
- a plurality of variable amplifier structures that receive the second signal stream, each variable amplifier structure provides a specified amount of gain to their respective second signal in the second signal stream so as to produce a third output signal stream; and
- a multiplexer that selects a third signal from the third output signal stream, via a signal stream selection module, to produce a digital signal.

* * * * *